United States Patent [19]
Oliver

[11] 3,855,287
[45] Dec. 17, 1974

[54] PROCESS FOR THE PRODUCTION OF 4,4-DIBROMOBENZIL

[75] Inventor: Ward H. Oliver, Mobile, Ala.

[73] Assignee: Ciba-Geigy Corporation, Ardsley, N.Y.

[22] Filed: Mar. 30, 1973

[21] Appl. No.: 346,400

[52] U.S. Cl. ............................ 260/523 R, 260/590
[51] Int. Cl... C07c 63/12, C07c 49/80, C07c 45/00
[58] Field of Search ......................... 260/523 R, 590

[56] References Cited
OTHER PUBLICATIONS
Van Es et al., J. Chem. Soc., 1963, pp. 1371–1377.

Primary Examiner—Lorraine A. Weinberger
Assistant Examiner—Richard D. Kelly

[57] ABSTRACT

A new process is provided for producing 4,4'-dibromobenzil (and p-bromobenzoic acid) by reacting 2,4,5-triphenylimidazol and bromine in the presence of an inert, water-insoluble organic solvent and oxidizing the intermediate product obtained with nitric acid as oxidizing agent.

4 Claims, No Drawings

PROCESS FOR THE PRODUCTION OF 4,4-DIBROMOBENZIL

DETAILED DISCLOSURE

The present invention relates to a process for the production of 4,4'-dibromobenzil (and p-bromobenzoic acid).

4,4'-dibromobenzil is an intermediate useful in the preparation of 4,4'-dibromobenzilic acid esters which are valuable as agents for combatting insects and acarinae. An especially valuable commercial compound which is used as insecticide and acaricide is 4,4'-dibromobenzilic acid isopropylester. See U.S. Pat. No. 3,639,446.

It is known from H. Biltz, Ann. 368, 173 (1909) and H. Biltz, Ber. 41, 1761 (1909) that by reacting benzoin with urea in the presence of glacial acetic acid at a temperature of about 115°C, 4,5-diphenyl-imidazol-2-one is obtained which in turn after having been dried, is brominated in the presence of glacial acetic acid, oxidized with bromine and hydrolyzed with bromine in diluted acetic acid to obtain 4,4'-dibromo-benzil. The preparation of 4,4'-dibromobenzil according to this requires that the 4,5-diphenylimidazol-2-one be separated and dried to permit the obtainment of the final 4,4'-dibromobenzil in a yield of about 70% calculated on the starting benzoin.

An improved process according to pending patent application Ser. No. 159,565 for the production of 4,4'-dibromobenzil comprises reacting benzoin with urea in the presence of an inert water-insoluble organic solvent at temperatures of from 100° to 200°C, brominating the 4,5-diphenylimidazol-2-one thus obtained to form 4,5-bis-(4'-bromophenyl)-imidazol-2-one and oxidizing the bromination product to form 4,4'-dibromobenzil.

The object of this invention is the conversion of 2,4,5-triphenylimidazol to 4,4'-dibromobenzil (and p-bromobenzoic acid as a by-product).

The process according to the invention can be illustrated by the following reaction scheme:

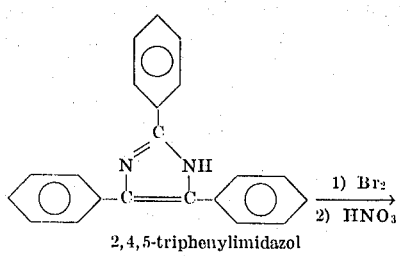

2,4,5-triphenylimidazol

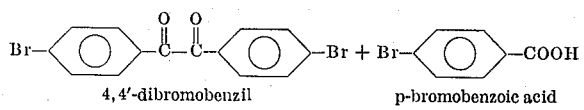

4,4'-dibromobenzil     p-bromobenzoic acid

The starting material, 2,4,5-triphenylimidazol, can be prepared by reacting cyanuric chloride and benzene to yield triphenyl-s-triazine of excellent quality in 81% yield. This triazine is reduced to the triphenylimidazol in 67.5% yield using zinc and acetic acid. These reactions are reported in the literature, e.g. E. M. Smolin and L. Rapoport, *Heterocyclic Compounds:* s-Triazines and Derivatives, pp. 155 and 163 Interscience Publishers, Inc., New York, 1967) and references cited therein. The triphenylimidazol starting material can also be prepared in one step from benzil, benzaldehyde, and ammonium in acetic acid.

Bromination of the 2,4,5-triphenylimidazol can be accomplished with elemental bromine in an inert organic solvent, such as o-dichlorobenzene, nitrobenzene, chlorobenzene, bromobenzene, dibromoethylene, acetic acid and preferably o-dichlorobenzene, with, preferably, a small amount of iodine as catalyst. If a catalyst is employed, it can be up to 10% by weight and, preferably, 1 to 5% by weight. A temperature of at least about 110°–120° C is required to cause evolution hydrobromic acid. Five moles of bromine are consumed per mole of substrate.

After a period of several hours, the batch is cooled and the resulting slurry is reacted with nitric acid as oxidizing agent. The batch is then filtered as is (containing bromine, solvent, nitric acid, etc.) and yellow crystals are obtained. The bromine can also be removed by steam distillation and the p-bromobenzoic acid extracted with caustic. Crude yields of 4,4'-dibromobenzil are about 60–72%; p-bromobenzoic acid is obtained in about 50% yield.

The following non-limitative examples serve to illustrate the process of the invention.

EXAMPLE 1

Triphenyl-s-triazine

To a 500-ml. 3 necked flask was charged 30.3 g (0.164 moles) of cyanuric chloride, 66.5 g (0.50 mole) of aluminum chloride, and 200 ml of benzene. The mixture was refluxed 2 hours, and left overnight. Then 200 ml of water was added. The mixture was filtered, washed with water, and dried.

Yield: 41 g (81%) of triphenyl-s-triazine, mp 233° (lit. = 233°)

EXAMPLE 2

2,4,5-Triphenylimidazol from Triphenyl-s-triazine

To a 500 ml. 3-necked flask was charged 200 ml of acetic acid, 31 g (0.1 mole) of triphenyl-s-triazine, and 25 g of zinc. After 2 hours reflux an additional 10 g of zinc was added and reflux continued an additional hour. The mixture was then filtered hot, and the filtrate was diluted with 400 ml of water. The precipitate which formed was filtered and dried to yield 20 g (67.5%) of 2,4,5-triphenylimidazol, mp 265°–269° (lit. = 274°).

EXAMPLE 3

2,4,5-Triphenylimidazol from Benzil

To a 3-liter, 3-necked flask was charged 315 gm (1.50 moles) of benzil, 160 gm (1.51 moles) of benzaldehyde, 450 gm (5.85 moles) of ammonium acetate, and 1,400 ml of glacial acetic acid. The mixture was heated slowly to reflux (over 1 hour). The solids went into solution, and shortly a precipitate was formed. The mixture was refluxed 1.5 hours, and 500 ml of water was added. The batch was cooled to room temperature and filtered. The residue was washed with water, and more precipitate formed in the filtrate. This indicates the high solubility of 2,4,5-triphenylimidazol in acetic acid. More water was added, and additional crops of crystals were formed. The crops were combined to yield 423 g (95.3%) of 2,4,5-triphenylimidazol, mp 276.8°–277.4° (lit. = 274°).

EXAMPLE 4

4,4'-Dibromobenzil with o-Dichlorobenzene Solvent

To a 500 ml. 3-necked flask was charged 60 g (0.2 moles) of 2,4,5-triphenylimidazol, 250 ml of o-dichlorobenzene and about 0.5 g iodine. The batch was heated to 100°C, and bromine addition was started. A total of 190 gm (1.18 mole) of bromine was added, with the temperature kept at 110°–120° C for 5 hours. The batch was cooled, and 100 ml 70% of nitric acid was added. The batch was stirred 2 hours, then left overnight. The batch was heated to 80°C, and steam stripped to remove $BR_2$ and about half of the o-dichlorobenzene. The batch was cooled and the water layer decanted. 100 ml of water was then added, and the batch was neutralized with 50% caustic. The water layer was separated, acidified, and filtered to yield 10 gm (50%) of p-bromobenzoic acid, mp 245°–248° (lit. = 251°). The organic slurry was filtered and the residue washed with isopropanol. The residue was dried to yield 52 g (71%) of 4,4'-dibromobenzil, mp 220°–225° (lit. = 228°).

EXAMPLE 5

4,4'-Dibromobenzil with Acetic Acid Solvent

To a 500 ml. 3-necked flask was charged 30 gm (0.1 mole) of 2,4,5-triphenylimidazol, 150 ml of glacial acetic acid, and 95 gm (0.59 moles) of bromine, as in Example 4. After the disapperance of the bromine color, the batch was cooled and 50 ml of 70% nitric acid added. The batch was stirred for 2 hours, then filtered. The residue was slurried in a sodium hydroxide solution and again filtered, to yield 12.5 g (33%) of 4,4'-dibromobenzil, mp 210°–218°.

What is claimed is:

1. A process for the production of 4,4'-dibromobenzil, which comprises
   a. reacting benzene with cyanuric chloride in the presence of aluminum chloride at reflux temperatures,
   b. reducing the resulting triphenyl-s-triazine in the presence of zinc at reflux temperatures,
   c. brominating the resulting 2,4,5-triphenylimidazol with bromine,
   d. oxidizing the bromination product with nitric acid and
   e. recovering 4,4'-dibromobenzil from a mixture of 4,4'-dibromobenzil and p-brombenzoic acid.

2. A process for the production of 4,4'-dibromobenzil and p-bromobenzoic acid which comprises
   a. reacting benzene with cyanuric chloride in the presence of aluminum chloride at reflux temperatures,
   b. reducing the resulting triphenyl-s-triazine in the presence of zinc at reflux temperatures,
   c. brominating the resulting 2,4,5-triphenylimidazol with bromine,
   d. oxidizing the bromination product with nitric acid.

3. A process for the production of 4,4'-dibromobenzil, which comprises
   a. reacting benzil, benzaldehyde and ammonium acetate in an inert organic solvent at reflux temperatures,
   b. brominating the resulting 2,4,5-triphenylimidazol with bromine,
   c. oxidizing the bromination product with nitric acid and
   d. recovering 4,4'-dibromobenzil from a mixture of 4,4'-dibromobenzil and p-bromobenzoic acid.

4. A process for the production of 4,4'-dibromobenzil and p-bromobenzoic acid which comprises
   a. reacting benzil, benzaldehyde and ammonium acetate in an inert organic solvent at reflux temperatures,
   b. reducing the resulting triphenyl-s-triazine in the presence of zinc at reflux temperatures,
   c. brominating the resulting 2,4,5-triphenylimidazol with bromine,
   d. oxidizing the bromination product with nitric acid.

* * * * *